United States Patent Office 3,640,918
Patented Feb. 8, 1972

3,640,918
PROCESS FOR THE MANUFACTURE OF FOAM MATERIALS CONTAINING PLASTICIZERS AND MADE OF POLYVINYL CHLORIDE AND COPOLYMERS OF VINYL CHLORIDE
Otto Fuchs, Oberlar, uber Troisdorf, Germany, assignor to Dynamit Nobel AG, Troisdorf, Germany
No Drawing. Filed Apr. 7, 1969, Ser. No. 815,263
Claims priority, application Germany, Apr. 8, 1968,
P 17 69 127.9
Int. Cl. C08f 45/40, 47/08
U.S. Cl. 260—2.5 P
9 Claims

ABSTRACT OF THE DISCLOSURE

Improvements in forming plasticized vinyl chloride polymer foams by admixing vinyl chloride polymer plastisols with a substantially moisture-free wetting or dispersing agent at least partially dissolved in a fatty alcohol and then foaming such admixture with a substantially inert gas.

---

A number of methods are known for the preparation of foam materials from plasticized polymers or copolymers of vinyl chloride. According to one method, a starting plastisol is foamed by purely mechanical procedures, such as by means of a foam whipping machine or, according to U.S. Pat. 2,917,473, with a mixing apparatus having a rotating mixing element, very small amounts of air being preferably mixed mechanically into the plastisols by parts of the apparatus which rotate at high speed.

According to another process, a plastisol is saturated under pressure with an inert gas and then the entire mixture is relieved of pressure so that it foams. In all of these known procedures for foaming, the primarily formed foam is made to set by elevation of the temperature.

Aside from some special applications in which coarse foam materials are desired, by far the greatest number of users desire a uniformly fine pore structure, and one that is free of fissures, large blow-holes, coarse pores and large clusters of cells. At the same time, of course, these foams must have other desirable physical properties, such as good strength, resistance to wear, etc. The fineness and uniformity of the pore structure are important, for example, particularly in cases in which these foams are bonded together by high-frequency welding. The above-mentioned irregularities of the pore structure would, if this electrical welding method were used, result in high-frequency perforations, destruction of the electrodes, and a large percentage of rejects. In addition to the refinement and improvement of foaming apparatus, attempts have been made also to modify the formulas of the substances being foamed as an aid in arriving at the desired uniform, finely porous foam materials.

For example, according to one method, that of German Green Pat. 1,245,121, 0.1 to 0.5% by weight of water is added to the plastisol, and the foaming is performed by saturating the mixture with a gas under elevated pressure and then letting off the pressure. In this prior-art process it is said that the slight moisture content is important to the fineness and uniformity of the foam structure. To facilitate the working of the small amount of moisture into the plastisol, it is proposed that the water first be dispersed in an emulsifying agent—say in a 50% solution of sodium dioctyl sulfosuccinate in dioctyl phthalate, or also that it be dispersed in the stabilizers. As it can be seen from Examples 1 and 2 of this patent, however, no decisive importance is attributed to the sodium dioctyl sulfosuccinate, because identical results are obtained whether the water is emulsified in the stabilizer alone—i.e., without wetting agent—or together with the addition of a wetting agent. Neither is the use of wetting agents claimed by itself; instead it is only claimed that the plastisol is foamed with the addition of water and at an atmospheric moisture content within a certain range—a measure which has previously been disclosed in Chemical Engineering 63/7 (July 1956) page 124, right column, paragraph 5.

This prior-art method suffers from a considerable disadvantage inasmuch as it is difficult, though it is said to be very important, to maintain a precise moisture content of 0.1 to 0.5% by weight. Compliance with this important requirement is technically expensive, if for no reason other than the fact that the moisture content of commonly available polyvinyl chloride can amount to from 0.6 to 1% by weight. If the moisture content in the plastisol turns out to be higher, the reverse effect is produced in the formation of the foam, and coarsely porous foams are produced.

There is a similar process that aims at producing coarse foam materials, and it is the subject of German Green Pat. 1,082,402. Moisture contents of from 2 to 10 wt. percent are recommended in this process, and in this process, too, surface-active substances can be added to the water. This method results in the production of uniform but very coarsely porous foams.

In short, it can be said that the addition to water to polyvinyl chloride plastisols or to vinyl chloride copolymer plastisols results in considerable disadvantages. For example, such aqueous mixtures usually exhibit a strongly thixotropic behavior. The result is that a free flowing of the compound before or after foaming is no longer possible. A standing mountain of foam develops, in which a smooth and even surface can no longer form. Due to the lack of fluidity, the pores or bubbles can no longer freely develop and grow, which ultimately results in fissures and irregular pore structures or shredded-mass structures. The mechanical characteristics, especially the tensile strength of such foams prove to be undesirable.

It is known that the addition of lower aliphatic alcohols to plasticized PVC compositions also has a negative effect upon the production of foam.

Thus the state of the art as it exists is to the effect that neither by the addition of water nor by the addition of any other substance nor by any other measures has it been possible hitherto to prepare from polyvinyl chloride or from copolymers of vinyl chloride a sufficiently uniform and fine foam material containing plasticizer, which is satisfactory for all purposes, without the necessity of putting up with considerable disadvantages with regard to economy or with regard to the nature of the foam material.

It is therefore an object of this invention to provide a novel method of producing substantially uniform fine-pored plasticized vinyl chloride polymer foams which do not suffer from the disdvantages of the prior art.

It is another object of this invention to provide an economically attractive method of producing substantially uniform fine-pored vinyl chloride polymer foams.

Other and additional objects of this invention will become apparent from a consideration of the entire specification, including the claims.

In accord with and fulfilling these objects, one aspect of this invention resides in a method which comprises forming an admixture of a vinyl chloride polymer, a suitable plasticizer therefor, and at least one wetting or dispersing agent at least partially dissolved in at least one fatty alcohol; foaming said admixture by the passage of inert gas therethrough; and then setting the foamed shape thus produced.

The admixture of vinyl chloride polymer and plasticizer therefor is referred to herein and in the trade as a vinyl chloride polymer plastisol.

Vinyl chloride homo or copolymers can be used in the process of the invention. These copolymers are exemplified by those of vinyl chloride with vinyl acetate, vinylidene chloride, acrylonitrile, maleic acid esters or fumaric acid esters and other similar olefinically unsaturated compounds. These comonomers can be contained in the polymers in percentages of about 5 to 15% by weight of the copolymer.

Plasticizers useful in this invention are those which are commonly used in connection with vinyl chloride homo- and/or copolymers. These may be exemplified by esters such as alkyl phthalates, alkyl adipates, alkyl sebacates, alkyl and alkylaryl phosphates, and alkylsulfonic acid aryl esters, which are per se known.

Wetting or dispersing agents suitable for the performance of the process according to the invention are, for example, anionically active salts, preferably alkali metal or ammonium salts of sulfuric acid monoesters of higher fatty alcohols and/or dialkylsulfosuccinates having about 4 to 13 carbon atoms in the alkyl radicals. Examples of such substances are sodium lauryl sulfate, sodium, potassium and ammonium octyl sulfate; the corresponding salts of monocetylsulfuric acid ester and of tridecylsulfuric acid ester; and sodium dioctylsulfosuccinate. In addition to the anionically active wetting or dispersing agents, noniono- genic emulsifiers are also suitable for the performance of the process according to the invention, as for example the sorbitan fatty acid esters, the polyoxyethylene sorbitan fatty acid esters and the polyoxyethylene fatty alcohol ethers. The anionic and nonionic surfactants are generally categorically useful in the process of this invention. The specific materials set forth above are to be considered as illustrative only, and not limiting, however. The surfactants of this invention have a favorable effect on the uniformity of the pores and the pore structure only when they are dissolved wholly or partially in higher fatty alcohols. Particularly suitable solvents for the wetting and/or dispersing agents are alcohols having about 8 to 20, preferably 10 to 18 carbon atoms, such as those prepared by the high-pressure hydrogenation of fatty acids obtained, for example, from coconut oil. Fatty alcohol types are preferred whose hardening range is about 17 to 23° C., i.e., those which are fluid at room temperature. The boiling ranges of these alcohols are around 255–285° C., i.e., above the setting temperature of the vinyl chloride polymer plastisols which is about 160–170° C.

Lauryl alcohol is an example of an alcohol having these properties which is especially suitable. The precise action of the fatty alcohols is not known. It can, however, be assumed that a synergistic effect is involverd. That is, the individual substances in the solutions or dispersions, that is, the surfactant alone or the higher fatty alcohol alone, have little or no effects in the qauntities in which they are used.

The ratio of the weight of the fatty alcohols to the weight of the surface active substances dissolved in them, and additionally present in the dispersions in the case of partial solubility, is about 1:1 to about 3:1. When the solutions or dispersions are being prepared, either a vessel with a stirrer or else a three-roll mill can be used, for example, depending on the properties of the starting materials. In many cases, dissolving the surfactant in the alcohol can be accelerated by heating.

According to the invention, the solution and/or, as the case may be the dispersion is added to the plastisols in quantities of 0.2 to 0.6% of the weight of the starting plastisol. It is also possible to operate by first stirring the solution or dispersion of the wetting agents or dispersants in fatty alcohols together with the plasticizers and the plastisol is then prepared therefrom by the addition of the homopolymer or copolymer of vinyl chloride.

An especially good pore uniformity and fineness can be achieved in the foams if the overall starting mixture is as water-free as possible, or at least contains less than 0.1 wt. percent moisture, based on the total starting composition.

Since the addition of the surface-active substances wholly or partially dissolved in fatty alcohols according to the invention has a favorable effect on the physical properties of the plastisols, especially their surface tension and viscosity, the process of the invention is applicable to practically all known technique for the production of foam materials. Particularly good results, however, are achieved if the foam is produced by saturating the plastisol with an inert gas under pressure and then releasing the pressure and letting it drop back to normal ambient atmospheric pressure.

Foam materials prepared according to the process of the invention have an especially uniform and fine pore structure in comparison to foam materials made by prior-art methods. No difficulties due to poor fluidity occur in the foaming process, such as high thixotropy and the like. Shredded-mass structures are substantially never found in the foams. It is also to be stressed that the foam materials prepared according to the invention have excellent mechanical properties. These favorable results in the manufacture of foam material by the use of the method of the invention were particularly surprising in as much as hitherto no positive effect has ever been observed in the formation of the foams when surface-active substances alone were added. It has been observed in the literature that the addition of oil-soluble barium and calcium petroleum sulfonates to PVC plastisols has an influence on the setting of monomeric plasticizers, and that in compounds containing calcium or barium oxide they exhibit synergistic effects in the stabilizer system as regards dehydration, acceleration of the decomposition of the blowing agents and reduction of viscosity. But the surface tension, and thus ultimately the formation of foam, is not affected in any way by such additives.

The preparation of the foam materials is performed, for example, by the method described in German Pat. No. 1,112,627 and in the apparatus described in German Pat. No. 1,141,440; the compositions cited in the examples are saturated under pressure with carbon dioxide-air mixtures in a gassing apparatus, then sprayed onto a conveyor belt of Teflonized (polytetrafluoroethylene) glass fiber fabric, and the wet foam is set in a high-frequency field. These examples are illustrative and non-limiting.

EXAMPLE 1

500 parts by weight of polyvinyl chloride (paste quality; K value 78) were mixed in a planetary mixer with 450 parts by weight of a plasticizer mixture containing 250 parts by weight of alkylsulfonic acid phenyl esters having 10 to 18 carbon atoms in the alkyl radical, 150 parts by weight of dinonyl phthalate and 50 parts by weight of trioctyl phosphate, with the simultaneous addition of 5 parts by weight of a stabilizer paste made of tribasic lead sulfate and dioctyl phthalate (weight ratio 1:1). After a plastisol of uniform consistency had developed, 3.3 parts by weight (corresponding to 0.4% of the weight of the plastisol) of a solution of sodium lauryl sulfate in technical lauryl alcohol (in a 1:2 ratio) was mixed in. The free-flowing composition thus developed displayed a typical Newtonian flow. It was saturated with a mixture of carbon dioxide and air (1:1 volume) under a pressure of 150 atmospheres gauge. Then the plastisol was relieved of pressure and heated at 160° C. A finely porous foam developed which flowed with a smooth surface, and which set and solidified under the influence of heat. The average diameter of the pores amounted to 0.2 to 0.3 mm.

EXAMPLE 2

500 parts by weight of polyvinyl chloride of the quality used in Example 1 was mixed in a planetary mixer with 400 parts by weight of a plasticizer mixture consisting of 225 parts by weight of alkylsulfonic acid phenyl esters having 10 to 18 carbon atoms in the alkyl radical, and 175 parts by weight of 2-ethylhexylphthalate, with the simultaneous addition of 5 parts by weight of the stabilizer compound used in Example 1. After a plastisol of uniform consistency had developed, 3.8 parts by weight of the solution used in Example 1 was added as a wetting agent. The resultant free-flowing composition exhibited typical Newtonian flow characteristics. It was foamed and set as in Example 1. The average diameter of the pores amounted to from 0.2 to 0.3 mm.

EXAMPLE 3

The same procedure was followed as in Example 1, but instead of the 3-ester plasticizer mixture, 300 parts by weight of a mixture of 160 weight-parts of alkylsulfonic acid phenyl esters having 10 to 18 carbon atoms in the alkyl radical and 140 weight-parts of di-n-octylphthalate was incorporated. Both the unfoamed prepared compound and the foam plastic produced therefrom exhibited properties analogous to those of the compositions according to Example 1.

The process will be further explained with the aid of the Examples 4 to 21 listed in the following table.

of ammonium salts of sulfuric acid monoesters of higher fatty alcohols, alkali metal salts of sulfuric acid monoesters of higher fatty alcohols, dialkyl sulfosuccinates, sorbitan fatty acid esters, polyoxyethylene sorbitan fatty acid esters, and polyoxyethylene fatty ethers.

3. Improved process of claim 1, wherein the starting plastisols for the foam material contain less than about 0.1 wt. percent of water with reference to the total starting composition.

4. Improved process of claim 1, wherein said surfactant containing plastisols are foamed by saturating them under pressure with inert gases, and then relieving the pressure.

5. Improved process claimed in claim 5, wherein said inert gas is a mixture of carbon dioxide and air.

6. Improved process claimed in claim 6, wherein said carbon dioxide and air are in a 1:1 volume ratio.

7. Improved process of claim 1, wherein said fatty alcohol has about 10 to 18 carbon atoms therein.

8. Improved process of claim 1, wherein a mixture of fatty alcohols is used.

9. Improved process of claim 1, wherein said alcohol has a melting point of about 17 to 23° C. and a boiling point of about 255° C. to 285° C.

TABLE

| Example | Wetting agent added | Weight percent | Plastisol basic formula per Example | Behavior of plastisol plus wetting agent. | Behavior of the wet foam | Foam structure | Average pore diameter in mm. |
|---|---|---|---|---|---|---|---|
| 4 | Lauryl alcohol (technical) plus sodium dioctyl sulfosuccinate (1/1). | 0.4 | 1 | Free-flowing composition with very slight thixotropy. | Foam flowing with a smooth surface. | Finely porous | 0.2–0.3 |
| 5 | | | 2 | | | | |
| 6 | | | 3 | | | | |
| 7 | Lauryl alcohol (technical) plus sodium lauryl sulfate plus sodium dioctyl sulfosuccinate (3/1/1). | 0.4 | 1 | Free-flowing composition with slight thixotropy. | Slow-flowing foam, but still has smooth surface. | ___do___ | 0.15–0.28 |
| 8 | | | 2 | | | | |
| 9 | | | 3 | | | | |
| 10 | None | | 1 | Free-fllwing composition with Newtonian flow characteristics. | Fast-flowing foam with smooth surface. | Very coarsely porous. | (1) |
| 11 | | | 2 | | | | |
| 12 | | | 3 | | | | |
| 13 | Lauryl alcohol (technical). | 0.4 | 1 | Free-flowing composition with very slight thixotropy. | Flowing foam, smooth surface. | Coarsely porous | 0.6–0.9 |
| 14 | | | 2 | | | | |
| 15 | | | 3 | | | | |
| 16 | Sodium lauryl sulfate (dispersed in plasticizer). | 0.4 | 1 | Free-flowing composition with Newtonian flow characteristics. | Fast-flowing foam | ___do___ | 0.6–0.9 |
| 17 | | | 2 | | | | |
| 18 | | | 3 | | | | |
| 19 | Sodium dioctyl sulfosuccinate (dissolved in plasticizer). | 0.4 | 1 | Free-flowing composition with very slight thixotropy. | Flowing foam, smooth surface. | Coarsely porous to medium porous. | 0.5–0.8 |
| 20 | | | 2 | | | | |
| 21 | | | 3 | | | | |

[1] Approximate 1 mm.

What is claimed is:

1. In the process of forming foam materials of vinyl chloride polymers by the foaming of vinyl chloride polymer plastisols with inert gases followed by setting the foamed composition; the improvement which comprises admixing a substantially water-free fluid of 0.2 to 0.6 weight percent referred to said plastisol at least one surfactant selected from the group consisting of anionic and nonionic at least partially dissolved in at least one fatty alcohol in a ratio of 1:1 to 1:3 surfactant to alcohol having about 8 to 20 carbon atoms therein with said plastisol before the foaming.

2. Improved process of claim 1 wherein said surfactant is at least one member selected from the group consisting References Cited

UNITED STATES PATENTS

| 2,861,963 | 11/1958 | Butsch | 260—2.5 P |
| 3,197,423 | 7/1965 | Ackerman | 260—2.5 P |
| 3,432,449 | 3/1969 | Deal et al. | 260—2.5 P |

MURRAY TILLMAN, Primary Examiner

W. J. BRIGGS, SR., Asisstant Examiner

U.S. Cl. X.R.

260—23 XA, 30.6 R, 31.8 G, 31.8 R, 33.4 R, 92.8 A; 264—26, 50